Nov. 3, 1964  C. D. BRANSON ETAL  3,155,316
THERMOSTATIC CONTROL DEVICE
Filed Feb. 23, 1961  3 Sheets-Sheet 1

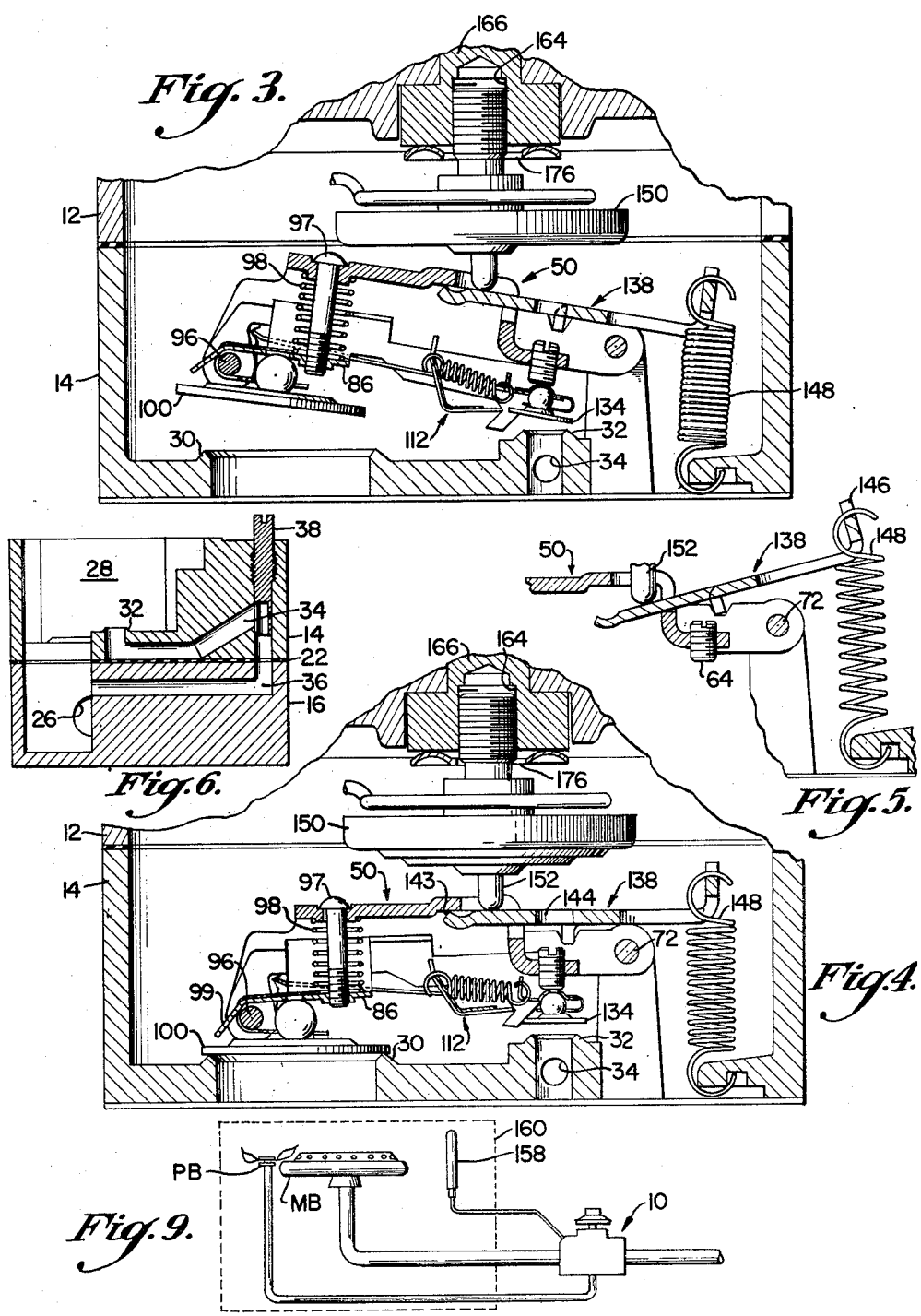

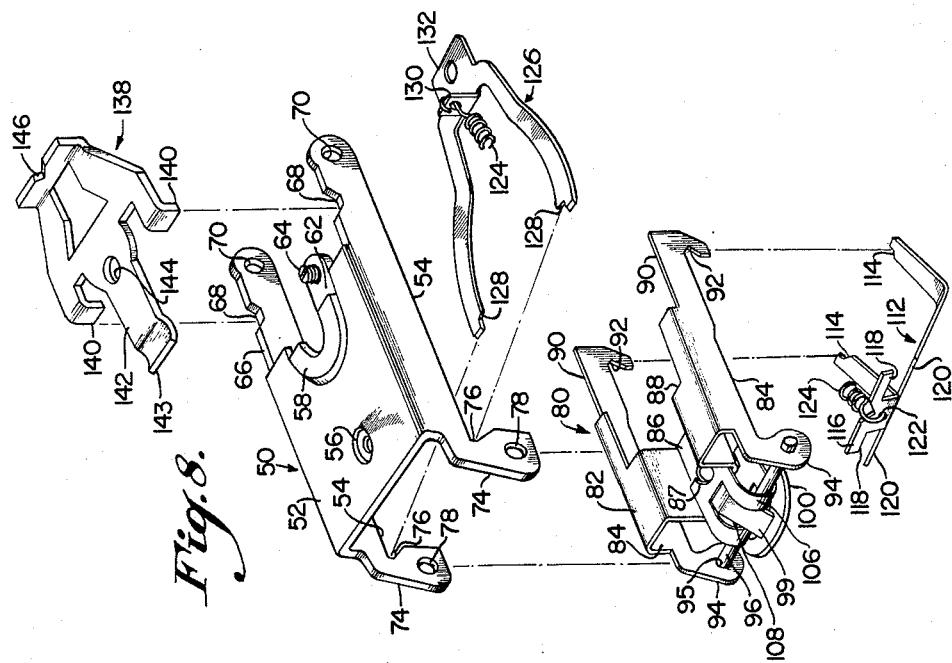
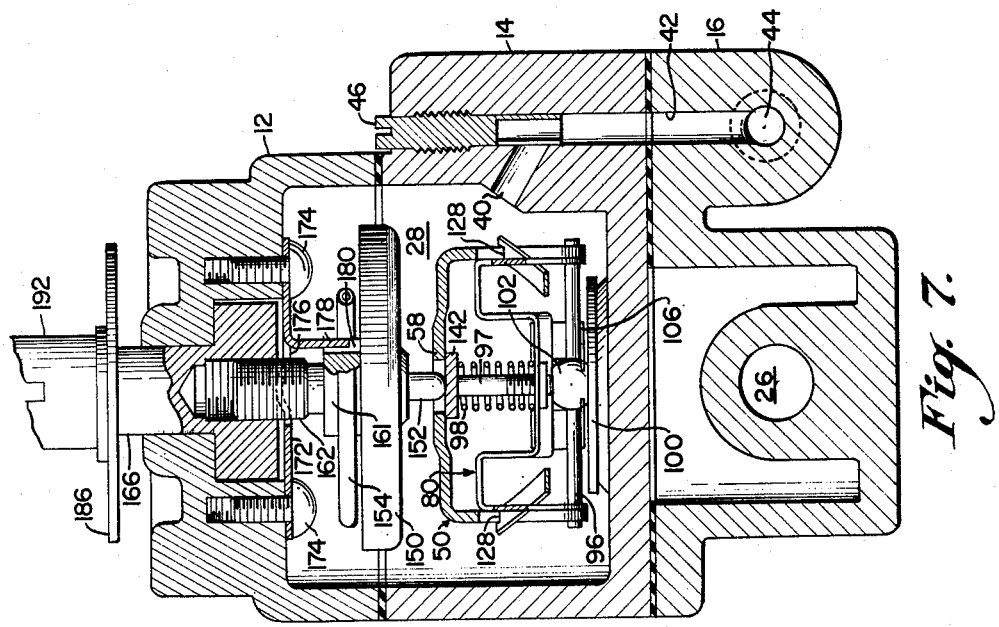

United States Patent Office 3,155,316
Patented Nov. 3, 1964

3,155,316
THERMOSTATIC CONTROL DEVICE
Charles D. Branson and Clarence Wantz, Greensburg, Pa., assignors to Robertshaw Controls Company, a corporation of Delaware
Filed Feb. 23, 1961, Ser. No. 91,105
8 Claims. (Cl. 236—48)

This invention relates to thermostatic control devices and more particularly to a thermostatic valve means for controlling a flow of gaseous fuel to the burner of an appliance, such as the oven of a gas range.

It is usual practice in gas oven operation to supply the burner with a predetermined minimum flow of gas even at times when the main thermostatic valve is closed because the selected temperature is satisfied. Such a minimum flow is supplied by means of a bypass which circumvents the main thermostatic valve and is necessary to eliminate flashback and reignition difficulties which would be encountered in the event the flow of gas is completely shut off in response to thermostatic regulation. It thus becomes apparent that the gas oven cannot be operated at temperatures lower than that generated by the flame of the bypass flow of fuel.

An object of this invention is to thermostatically control a minimum fuel flow to a burner.

This invention has another object in that the main flow and a minimum flow of fuel to a burner is sequentially controlled by thermostatic action.

A further object of this invention is to prevent damage to the snap throttle valve mechanism of a thermostatic control device during overshoot of the thermostatic element.

In the preferred embodiment of this invention, the valve chamber of a thermostatic control device is formed with a main flow valve seat and a minimum flow valve seat. A thermostatically actuated lever system is operable to shut off the main valve seat with a throttling action and to shut off the minimum flow valve seat with a snap action.

Other objects and advantages of this invention will become apparent from the following description taken in connection with the accompanying drawings wherein:

FIG. 3 is a partial view of FIG. 2 showing the valve mechanism in another position;

FIG. 4 is a partial section similar to FIG. 3 showing the valve mechanism in another position;

FIG. 5 is a partial sectional view of a detail of FIG. 2 shown in another position;

FIG. 6 is a partial section taken on line VI—VI of FIG. 1;

FIG. 7 is a section taken on line VII—VII of FIG. 2;

FIG. 8 is an exploded perspective of a detail of FIG. 2; and

FIG. 9 is a schematic diagram of a system embodying this invention.

Figure 1:
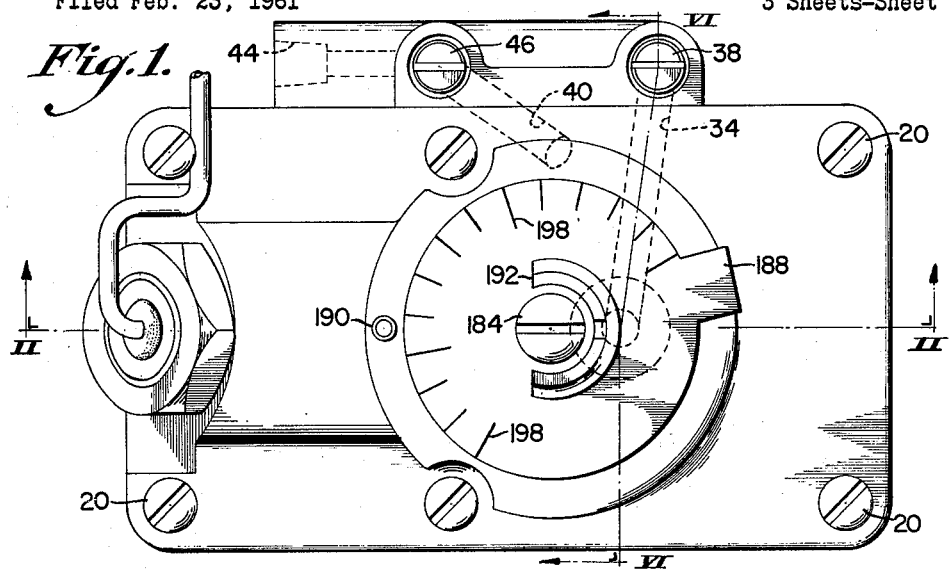
FIG. 1 is a top plan view of a thermostatic control device embodying this invention.
Figure 2:
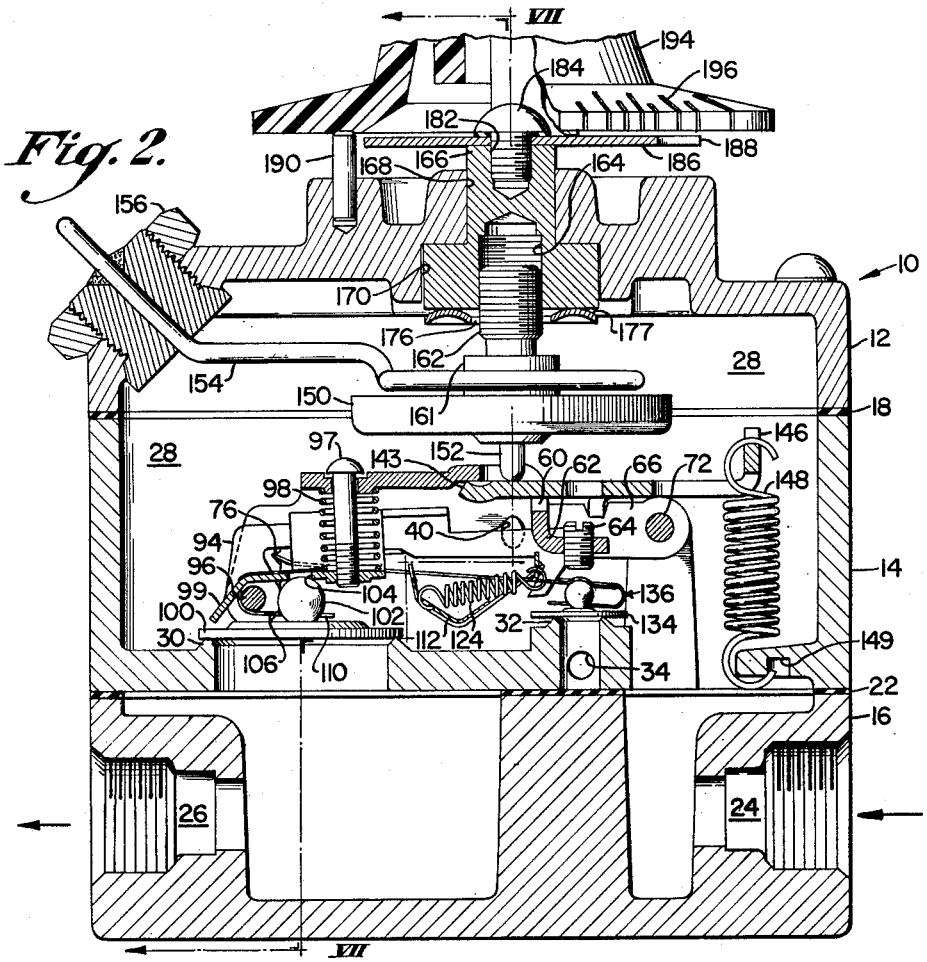
FIG. 2 is a section taken on line II—II of FIG. 1.

As is illustrated in FIGS. 1 and 2, the control device includes a casing, indicated generally at 10, having a top cover housing 12, a center housing 14, and a lower housing 16. The cover housing 12 is sealed to the center housing 14 as by a gasket 18 and is secured thereto by means of a plurality of cap screws 20; similarly, the lower housing 16 is sealed to the center housing 14 by a gasket 22 and secured thereto by a plurality of cap screws (not shown). The casing 10 has an inlet port 24 and an outlet port 26 with a valve chamber 28 therebetween. The center housing 14 is internally formed with a main flow valve seat 30 and a minimum flow valve seat 32 for respectively controlling a main flow and a minimum flow of a gaseous fuel from the chamber 28 to the outlet 26.

The main flow valve seat 30 communicates directly with the outlet chamber of the outlet port 26 but the minimum flow valve seat 32 communicates with such outlet chamber by means of a bypass as best illustrated in FIG. 6. The bypass for the minimum flow valve seat 32 comprises a first passageway 34 in the central housing 14 communicating with a second L-shaped passageway 36 in the lower housing 16. The passageway 34 is intersected by an adjusting key 38 whereby the minimum flow may be selectively adjusted for particular installations. The housings 14 and 16 are suitably bored to provide a pilot flow from the valve chamber 28. As best shown in FIG. 7, the pilot flow passageway comprises a generally L-shaped passage 40 in the casing 14 communicating with an aligned passage 42 in the lower casing 16 which is provided with a perpendicularly disposed pilot outlet port 44. The passage 40 is intersected by an adjusting key 46 to selectively adjust the pilot flow to the outlet 44. As is best illustrated in FIG. 1, the adjusting keys 38 and 46 are suitably threaded into a boss portion formed on the side of the central housing 14 and lower housing 16.

Valve operation is accomplished by means of a lever mechanism suitably mounted within the central casing 14. As is shown in FIG. 8, the lever mechanism includes a lever frame 50 comprising a generally flat rectangular plate 52 having a pair of downwardly depending flanges 54 perpendicularly extending from opposite sides. Between the side flanges 54, the plate 52 is provided with an aperture and counterbore 56 adjacent its rear edge for a purpose to be described hereinafter. The forward edge of the plate 52 has a centrally disposed semicircular boss 58 raised upwardly out of the plane defining the plate 52. On each side of the raised boss 58, the forward edge of the plate 52 is provided with perpendicularly depending flanges 60, the lower portions of which are connected by a T-shaped bar 62 having a threaded aperture on its free end for receiving a set screw 64. The side flanges 54 have forward extensions 66 with substantially V-shaped aligned notches 68 on their top edges and aligned apertures 70 adjacent their free ends. A pivot pin 72 extends through the apertures 70 and is securely mounted in the opposite walls of the central casing 14 to provide a pivotal mounting for the lever frame 50. The side flanges 54 also have rearward extensions 74 with V-shaped notches 76 in their front edges and aligned apertures 78 adjacent their free ends.

A snap lever 80 has an overall configuration similar to the frame 50 including a top plate 82 and depending side flanges 84. The central part of the plate 82 is deformed into a generally U-shaped configuration to define an apertured depressed portion 86 with the centrally disposed threaded aperture 89 in alignment with the counterbore 56 of the frame plate 52. The forward edge of plate 82 is notched to define a U-shaped cutout 88 to provide clearance for structure to be defined hereinafter. The side flanges 84 have forward extensions 90 provided with reversely bent ends to define substantially V-shaped bearing notches 92. The side flanges 84 each have rearward extensions 94 suitably apertured so as to present a pair of apertures 95 in alignment with the frame apertures 78. The snap lever 80 is carried by the frame 50 by means of a pivot pin 96 extending through the four aligned apertures 78 and 95. An adjusting screw 97, having a smaller diameter than the counterbored aperture 56, loosely extends through the counterbored aperture 56 and is threaded into the depressed portion 86 of the snap lever 80. A coil spring 98 encircles the shank of the adjusting screw 97 and is mounted in compression between the undersurface of the lever frame 50 and the uppersurface of the depressed portion 86 of snap lever 80. Because of the loose fit between the adjusting screw 97 and the counterbored aperture 56, the adjusting screw 97 may be moved laterally within the counterbored aperture 56. The depressed central portion 86 of plate 82 has a downwardly inclined tab 99 extending from its rear edge.

A disc-shaped throttling valve 100 is disposed adjacent the main flow valve seat 30 and has a ball 102 integrally secured to its rear face which rests in an apertured seat 104 in the depressed portion 86 of the lever plate 82. The ball 102 provides a pivotal mounting for the valve member 100 and is attached to the depressed portion 86 by means of a C-shaped spring 106. The C-shaped spring 106 has a central slot 108 receiving the rear extension tab 99 so that the upper part of the spring 106 resiliently engages the upper surface of the depressed portion 86. The lower portion of the spring 106 straddles the pivot pin 96 and its free end is bifurcated into two leg members 110 straddling the ball 102 to retain the same against the apertured seat 104.

An overcenter snap acting mechanism includes a generally U-shaped yoke member 112, the legs of which are provided with knife edge bearings 114 disposed in the V-shaped notches 92 of the snap lever 80. The base of the U-shaped yoke member 112 is inclined and integrally formed with a T-shaped member 116, the bottom edges of which form upper stops 118 while the top edges of the base member form lower stops 120. The T-shaped member 116 has a centrally disposed aperture 122 which receives one end of a coil spring 124.

A generally U-shaped toggle member 126 has knife edges 128 on the ends of its legs disposed in the notches 76 of the lever frame 50. The base portion of the U-shaped toggle 126 has an upstanding apertured tab 130 which receives the other end of the coil spring 124. The coil spring 124 is thus mounted in tension between the yoke member 112 and the toggle 126 and retains their respective knife edge bearings in the corresponding notches.

The base portion of the toggle member 126 has an apertured end 132 which carries a disc-type snap valve 134 for cooperation with the minimum flow valve seat 32. The valve disc 134 is pivotally carried by the toggle end 132 by a ball and C-shaped spring arrangement 136 which is substantially similar to the pivotal mounting means for the main throttling valve disc 100 so that further description will not be repeated. The set screw 64 abuts the upper surface of the apertured end 132 to limit upward movement of toggle 126 and valve disc 134.

An overshoot lever 138 has a pair of depending legs 140 bent perpendicularly from its forward edge and being disposed in the notches 68 of the lever frame 50. The forward edge of lever 138 has a central extension 142 with a crimped end 143 which engages the undersurface of the raised boss 58 of the lever frame 50. The central extension 142 has an enlarged aperture 144 to provide access to the adjusting screw 64 for adjusting the snap disc valve 134 and the toggle 126. The rear edge of the overshoot lever 138 has an upstanding notched tab 146 which receives one end of a coil spring 148. The coil spring 148 extends through an opening in the lever 138 and its opposite end is attached to a notched portion 149 formed in an internal wall of the central housing 14. The coil spring 148 is mounted in tension and causes the overshoot lever to be normally biased clockwise about the axis defined by the legs 140 and its end 143 to be normally biased into engagement against the lever frame 50.

As is illustrated in FIG. 2, a contractible and expansible power element 150 in chamber 28 has a button 152 in engagement with the central extension 142 for actuating the overshoot lever 138 against the bias of tension spring 148. A capillary tube 154 has one end (not shown) communicating with the interior of power element 150. The capillary tube 154 extends through the upper housing 12 where it is sealed by means of a packing screw and lock nut 156. The other end of the capillary tube 154 is connected to a temperature sensing bulb 158 suitably positioned in a space to be temperature controlled, such as an oven indicated schematically at 160 in FIG. 9.

The power element 150, capillary tube 154, and sensing bulb 158 constitute a closed system filled with an expansible fluid so that a variation of temperature sensed by bulb 158 produces a corresponding expansion or contraction of the power element 150.

On its face opposite to the button 152, the power element 150 is provided with a threaded stud 162 disposed in a threaded bore 164 of an operating shaft 166. The operating shaft 166 has a generally T-shaped cross section with the leg of the T extending through a suitable bore 168 in the top of upper housing 12 and the base of the T being rotatably disposed within a counterbore 170 which opens into the chamber 28. The operating shaft 166 is rotatably disposed within the bore 168 and counterbore 170 and is retained therein by means of a substantially rectangular flat plate 172 secured to the top wall defining the undersurface of the upper housing 12 by any suitable fastener, such as bolts 174 shown in FIG. 7. A square opening 176 is centrally located in the plate 172 and has a larger dimension than the diameter of the threaded stud 162 whereby the stud 162 freely extends through the opening 176 into the threaded bore 164. One each side of the opening 176, the plate 172 is hemispherically depressed to define a pair of convex surfaces 177 which bear against the annular surface of the operating shaft 166. Adjacent the opening 176, the plate 172 has a perpendicularly bent lug 178 which is disposed in a longitudinal slot 180 formed in the periphery of the inner stud 161 and prevents rotation of the complete power element assembly. With such an arrangement, the rotary motion of the operating shaft 166 causes axial movement of the power element 150.

The outer end of operating shaft 166 has a threaded bore 182 for receiving a locking screw 184 which extends through a circular snap plate 186 and locks the stop plate 186 to the operating shaft 166 for unitary rotation. A generally rectangular flange 188 extends radially outwardly from a portion of the periphery of the plate 186 and cooperates with a fixed stop pin 190 extending from the top surface of the upper housing 12 to define the limits of rotation of the plate 186 and the operating shaft 166. A substantially D-shaped hollow sleeve 192 is integrally secured to the face of stop plate 186 so as to partially encompass the head of locking screw 184. A control knob 194, having a suitable temperature setting indicia 196 on its periphery, is mounted on the D-shaped sleeve 192 for unitary rotation. Adjacent its periphery, the face of stop plate 186 is provided with a plurality of calibrating indicia 196 adapted to cooperate with a fixed reference indicia such as the stop pin 190.

In order to place the thermostatic control device in operation for supplying a flow of fuel to the main burner and the pilot burner in the oven 160, the control knob 194 is rotated counterclockwise from its off position to a desired temperature setting. The off position of the various elements comprising the valve operating mechanism are shown in FIG. 2 wherein throttling valve 100 is in engagement with main flow seat 30 and the snap valve disc 134 is in engagement with the minimum flow seat 32. The yoke 112, the overcenter spring 124, and the toggle 126 comprise a snap acting mechanism for the disc valve 134. The snap acting mechanism pivots about an axis defined by the knife edges 128 and the notches 76. Movement of the snap lever 80 causes displacement of the pivotal axis defined by the knife edges 114 and notches 92, resulting in overcenter movement of the coil spring 124. As viewed in FIG. 2, coil spring 124 exerts a biasing force on the end 132 of the toggle 126 and the vertical component of this biasing force urges the free end 132 in a downward direction. Because the pivotal axis defined by the bearing notches 92 is located slightly above the apertured tab 130 where the force of the resilient coil 124 is applied, upward movement of the snap lever 80 moves the pivotal axis defined by the bearing notches 92 to a position slightly above the apertured tab 130 causing the coil spring 124 to move to its overcenter position whereupon the free end 132 of toggle 126 is moved with a snap action.

The entire lever assembly is biased in the clockwise direction around the pivot pin 72 by the coil spring 148 causing the lever assembly to follow the movement of the actuating button 152. The rotary motion of the shaft 166 by the dial 194 causes axial movement of the threaded stud 162 in the threaded bore 164, whereupon the actuating button 152 is displaced upwardly permitting the snap valve 134 and the throttling valve 100 to move to an open position as shown in FIG. 3. Assume that the pilot burner has already been ignited, it will provide a constant pilot flame in the oven 160 since the pilot flow of fuel through the control device 10 is not subject to thermostatic action. The gas supply main is connected to the inlet 24 and a pilot flow of fuel may be traced from the inlet 24 to the chamber 28, through passageways 40 and 42, thence through the pilot outlet 44 which is connected to the pilot burner by any suitable conduit means. With valve 100 in an open position, there is flow from inlet 24 through chamber 28, main flow valve seat 30 to outlet port 26 and through any suitable conduit means to the main burner where it is ignited by the pilot burner flame. It should be noted that the snap valve 134 is also disengaged from the minimum flow valve seat 32 so that gas from chamber 28 also flows through the valve seat 32 and passages 34 and 36 to the outlet port 26.

As the temperature of the oven 160 approaches that for which the dial 194 has been set, the power element 150 expands and the actuating button 152 moves the overshoot lever 138 and the lever frame 50 counterclockwise about the pivot pin 72 against the bias of the coil spring 148. The lever frame 50, the snap lever 80 and the snap acting mechanism are moved as a unit until the throttling valve 100 is seated on the main flow valve seat 30 and cuts off a main flow of fuel to the adequate port 26. The position of the valve members are now as shown in FIG. 4, wherein a minimum flow of fuel to the outlet port 32 is thermostatically controlled by the snap acting valve 134. Once the throttling valve 100 has been seated, additional expansion of the power element 150 causes the actuator button 152 to move the overshoot lever 138 and the lever frame 50 further counterclockwise about the pivot pin 72; inasmuch as the valve member 100 is already seated, this additional movement causes the snap lever 80 to react in a counterclockwise direction about the pivot pin 96. During such pivotal movement, the coil spring 98 is compressed slightly and the adjusting screw 97 is movable within the enlarged counterbore 56. At the same time, the axis defined by notches 92 on the snap lever 80 is moved upward as viewed in FIG. 4, causing overcenter movement of the spring 124 whereupon the disc valve 134 is moved into engagement with the valve seat 32 with a snap action, as shown in FIG. 2.

With the above arrangement, the main flow of fuel to the oven burners is gradually reduced as the throttling valve 100 is moved closer to the valve seat 30 in accordance with temperature increases, until slightly below the predetermined set temperature, whereupon the valve seat 30 is fully closed and the only flow of fuel is through the minimum flow valve seat 32. Should the controlled temperature exceed the set temperature, the further expansion of the power element 150 causes additional movement of the overshoot lever 138; however, inasmuch as the throttling valve 100 and the snap valve 134 are already closed, the lever frame notches 68 define a pivotal axis for the overshoot lever legs 140. Accordingly, the actuator button 152 moves the central extension 142 away from the embossed portion 58 of the lever frame 50 causing an extension of the coil spring 148 without damaging the seated valve members.

When the oven heat losses reduce the controlled temperature below the set temperature, the resulting contraction of the power element 150 causes opening of the snap acting valve 134 which will thermostatically cycle to maintain the oven at the set temperature.

Inasmuch as the above description and drawings are subject to various changes in structural details and reversal of parts, it is intended that the foregoing description and drawings be interpreted as illustrative and not in a limiting sense.

We claim:

1. In a thermostatic control device, the combination comprising a casing having an inlet and an outlet, a valve chamber in said casing communicating with said inlet, main valve means in said casing controlling a main fluid flow from said chamber to said outlet, bypass valve means in said casing controlling a bypass fluid flow from said chamber to said outlet, means pivotally mounted in said casing including a lever element for actuating said main valve means and a snap acting mechanism for actuating said bypass valve means with a snap action, thermally responsive means having a movable member operatively associated with said lever means for moving the same whereby said main valve means and said bypass means are subject to thermostatic cycling, and overshoot means operatively disposed between said movable member and said pivotally mounted means, said overshoot means being normaly biased into engagement with said movable member and being pivoted relative to said pivotally mounted means in the opposite direction of said biasing movement of said overshoot means in response to abnormal movement of said movable member in a valve means closing direction.

2. In a thermostatic control device, the combination comprising a casing having an inlet and an outlet, a valve chamber in said casing communicating with said inlet, main valve seat means establishing communication between said chamber and said outlet, bypass valve seat means establishing separate communication between said chamber and said outlet, thermally responsive means including an actuating member in said casing movable in response to temperature variations, a frame pivotally mounted in said casing, a lever carried by said frame for movement therewith and being pivotally movable relative to said frame, a main valve member carried by said lever for movement relative to said main valve seat means in response to unitary movement of said frame and said lever, a snap acting mechanism operatively disposed between said frame and said lever, a bypass valve member carried by said snap acting mechanism for snap movement relative to said bypass valve seat means in response to movement of said frame relative to said lever, and an overshoot lever biased into engagement with said actuating member and causing movement of said frame in response to temperature variations.

3. In a thermostatic control device, the combination comprising a casing having an inlet and an outlet, a valve chamber in said casing communicating with said inlet, means defining a pair of valve seats in said chamber communicating separately with said outlet, a pair of valve members, one for each valve seat for separately controlling a flow to said outlet, a frame having one end pivotally mounted in said casing, a lever having one end pivotally carried by another end of said frame, one of said valve members being carried by said lever adjacent the pivotally carried one end for movement relative to its corresponding valve seat, a snap acting mechanism operatively disposed between said frame and said lever, another of said valve members being carried by said snap acting mechanism for snap movement relative to its corresponding valve seat, an overshoot lever fulcrumed on said frame, thermally responsive means including an actuating member engaging said overshoot lever for moving said overshoot lever and said frame as a unit in response to temperature variations, resilient means biasing said overshoot lever for maintaining said overshoot lever in engagement with said frame, said overshoot lever pivotally moving on said frame against the bias of said resilient means in response to abnormal movement of said actuating member.

4. The combination as recited in claim 3 wherein temperature setting means is operatively connected to said thermally responsive means for manually positioning the same to a predetermined temperature.

5. The combination as recited in claim 4 wherein said temperature setting means comprises an operating shaft rotatably mounted in said casing and said thermally responsive means includes a non-rotatable element operatively connected to said shaft whereby rotary movement of said shaft causes axial movement of said thermally responsive means.

6. In a casing provided with two separate passageways, each said passageway being provided with a valve seat, a control device comprising the combination of a first pivotally mounted lever, a first valve member operatively connected to said first lever for movement relative to the first of said valve seats, a second pivotally mounted lever, a second valve member operatively connected to said second lever, said second lever being responsive to movement of said first lever for movement of said second valve member relative to the second of said valve seats, condition responsive means including an actuating member in said casing movable in response to condition changes, and an overshoot member biased into engagement with said actuating member and operatively connected with said first lever for movement of said first lever in response to condition changes, said overshoot member being movable relative to said first lever in the opposite direction of said biasing movement of said overshoot member in response to abnormal movement of said actuating member in a valve closing direction.

7. In a casing provided with two separate passageways, each said passageways being provided with a valve seat, a control device comprising the combination of a pivotally mounted frame, a first lever pivotally mounted to said frame and operatively connected to a first valve member for movement relative to the first of said valve seats responsive to movement of said frame, a second lever pivotally mounted to said frame and operatively connected to a second valve member for movement relative to the second of said valve seats responsive to movement of said frame, condition responsive means including an actuating member in said casing movable in response to condition changes, and an overshoot member pivotally mounted on said frame and biased into engagement with said actuating member and operative to cause movement of said frame responsive to movement of said actuating member.

8. In a casing provided with two separate passageways, each said passageway being provided with a valve seat, a control device comprising the combination of a pivotally mounted frame, a first lever pivotally mounted to said frame and operatively connected to a first valve member for movement relative to the first of said valve seats responsive to movement of said frame, a snap action mechanism pivotally mounted to said frame and operatively connected to a second valve member for snap movement of said second valve member relative to said second valve seat responsive to movement of said frame, condition responsive means including an actuating member in said casing movable in response to condition changes, and an overshoot member pivotally mounted on said frame and biased into engagement with said actuating member and operative to cause movement of said frame responsive to movement of said actuating member.

References Cited in the file of this patent

UNITED STATES PATENTS

| 387,713 | Farra | Aug. 14, 1888 |
| 2,664,246 | Ray | Dec. 29, 1953 |
| 2,855,152 | Tyler | Oct. 7, 1958 |
| 2,889,115 | Weber | June 2, 1959 |